(12) United States Patent
Lifliand et al.

(10) Patent No.: US 9,118,700 B2
(45) Date of Patent: *Aug. 25, 2015

(54) ENCRYPTED NETWORK TRAFFIC INTERCEPTION AND INSPECTION

(71) Applicant: Microsoft Corporation, Redmond, WA (US)

(72) Inventors: Vladimir Lifliand, Sammamish, WA (US); Avraham Michael Ben-Menahem, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/043,273

(22) Filed: Oct. 1, 2013

(65) Prior Publication Data
US 2014/0215610 A1     Jul. 31, 2014

Related U.S. Application Data

(63) Continuation of application No. 12/818,605, filed on Jun. 18, 2010, now Pat. No. 8,578,486.

(51) Int. Cl.
*G06F 11/00* (2006.01)
*G06F 12/14* (2006.01)
(Continued)

(52) U.S. Cl.
CPC ............ *H04L 63/12* (2013.01); *H04L 63/0428* (2013.01); *H04L 63/10* (2013.01); *H04L 63/30* (2013.01)

(58) Field of Classification Search
CPC . H04L 63/1408; H04L 63/1441; H04L 63/14; G06F 21/50; G06F 21/55

USPC .......................................................... 726/22
See application file for complete search history.

(56) References Cited

U.S. PATENT DOCUMENTS

| 7,254,114 B1 | 8/2007 | Turner et al. |
| 7,496,097 B2 | 2/2009 | Rao et al. |
(Continued)

FOREIGN PATENT DOCUMENTS

| CN | 1885836 A | 12/2006 |
| CN | 101430752 A | 5/2009 |

OTHER PUBLICATIONS

Wright et al., "On Inferring Application Protocol Behaviors in Encrypted Network," Journal of Machine Learning Research, 7:2745-2769. Dec. 2006.

(Continued)

*Primary Examiner* — Kambiz Zand
*Assistant Examiner* — Stephen Sanders
(74) *Attorney, Agent, or Firm* — Henry Gabryjelski; Kate Drakos; Micky Minhas (57) ABSTRACT

A method of operating a computing device that allows inspecting data that the device attempts to transmit over a network in an encrypted form for presence of malware, viruses or confidential information. The method includes intercepting a request from an application to an encryption component of an operating system to encrypt the data and acquiring encrypted data generated by the encryption component in response to the request. SSL or TLS protocol may be used for encryption. The request may be intercepted using API hooking. The data in an unencrypted form and an identifier of the encrypted data may be provided to a data inspection facility for establishing a correspondence between the unencrypted and encrypted data, using the identifier. The data inspection facility performs inspection of the unencrypted data to determine whether to allow transmission of the encrypted data over the network.

20 Claims, 6 Drawing Sheets

(51) Int. Cl.
  *G06F 12/16* (2006.01)
  *G08B 23/00* (2006.01)
  *H04L 29/06* (2006.01)

(56) References Cited

U.S. PATENT DOCUMENTS

| | | | |
|---|---|---|---|
| 7,624,435 B1* | 11/2009 | Huang | 726/12 |
| 7,627,896 B2 | 12/2009 | Herrmann | |
| 2006/0143700 A1* | 6/2006 | Herrmann | 726/14 |
| 2007/0112677 A1* | 5/2007 | Witt et al. | 705/50 |
| 2008/0282080 A1 | 11/2008 | Hyndman et al. | |
| 2009/0178061 A1 | 7/2009 | Sandoval et al. | |
| 2009/0204980 A1 | 8/2009 | Sandoval et al. | |
| 2009/0231998 A1 | 9/2009 | Bharadwaj et al. | |
| 2009/0254990 A1 | 10/2009 | McGee | |
| 2011/0060905 A1* | 3/2011 | Stack et al. | 713/167 |

OTHER PUBLICATIONS

Wright et al., "Using Visual Motifs to Classify Encrypted Traffic," VizSEC '06, Alexandria, Virginia, Nov. 3, 2006.

Antoniades, "Appmon: An Application for Accurate per Application Network Traffic Characterization," Broadband Europe, Geneva, Switzerland, Dec. 11-14, 2006.

U.S. Appl. No. 12/818,605, Non-Final Office Action mailed Jun. 28, 2012, 13 pages.

U.S. Appl. No. 12/818,605, Response to Non-Final Office Action mailed Jun. 28, 2012, filed Sep. 19, 2012, 14 pages.

U.S. Appl. No. 12/818,605, Final Office Action mailed Dec. 13, 2012, 15 pages.

U.S. Appl. No. 12/818,605, RCE-Response to Final Office Action mailed Dec. 13, 2012, filed Mar. 11, 2013, 16 pages.

U.S. Appl. No. 12/818,605, Notice of Allowance mailed Mar. 20, 2013, 9 pages.

U.S. Appl. No. 12/818,605, RCE-Response to Notice of Allowance mailed Mar. 20, 2013, filed Jun. 6, 2013, 12 pages.

U.S. Appl. No. 12/818,605, Notice of Allowance mailed Jul. 2, 2013, 9 pages.

ACM Digital Library, "Encrypted Network Traffic Interception and Inspection", http://dl.acm.org/results.cfm?h=1&cfid=90927547&cftoken=83466231, Jun. 23, 2012, 5 pages.

Chinese Patent Application No. 201110177843.5, Office Action dated Apr. 28, 2015, 17 pages (including English translation).

* cited by examiner

ENCRYPTED NETWORK TRAFFIC INTERCEPTION AND INSPECTION

CROSS-REFERENCE TO RELATED APPLICATIONS

This application claims priority to and is a continuation of co-pending U.S. patent application Ser. No. 12/818,605 entitled "Encrypted Network Traffic Interception and Inspection" and filed Jun. 18, 2010, which is incorporated herein by reference.

BACKGROUND

Security of computer systems is becoming an increasingly important issue, especially with the advent of the Internet which dramatically facilitated exchange of large amount of data among computers. The security may relate to protection of computer systems from attacks from malicious parties which may introduce viruses, worms and other malicious data to the systems. Another security issue relates to ensuring confidentiality of data transmitted over public networks, such as the Internet, by protecting the transmitted data from access by undesirable parties.

The security of a computer system may also encompass control of distribution and access of information stored in the computer system. For example, an enterprise or an organization may have a policy defining which information is desirable to be protected from being distributed outside of the enterprise's computer systems. Such information may include, for example, personal information, financial documents, medical records, description of confidential technology, and other sensitive information.

Computers exchange data using different network communications protocols, such as, for example, Transmission Control Protocol/Internet Protocol (TCP/IP). The TCP/IP has been developed to enable communications between computers, without specific concerns for security. Information transmitted in accordance with the TCP/IP may therefore be subject to different security vulnerabilities. Thus, a variety of security systems have been developed to protect computers from intrusion and to control information stored on the computers. Such security systems examine data received by the computer systems and data that the computer systems attempt to send. To determine whether to allow or block sending or receiving these data over a network, the security systems typically need access to the data in an unencrypted (or decryptable) form.

To improve their security and prevent undesirable interference with transmitted data, many applications increasingly use such measures as encryption and authentication. Different protocols are used to encrypt data sent over a network. A commonly used protocol for encryption and authentication is the Secure Socket Layer (SSL) protocol and its derivatives. While using the SSL improves security, data encrypted using the SSL protocol may not be properly analyzed and interpreted by network security systems controlling access to a network, because the data is encrypted. Malicious parties (e.g., applications and services) may use this feature to bypass security protections or security policies implemented by the network security systems. For example, if data containing viruses, Trojans, or other malicious content is sent or received in an encrypted form, this may not be detected by a network security system. In addition, encrypted sensitive data may be sent outside of an organization thus compromising data privacy.

SUMMARY

A system, method and computer-readable storage medium that allow inspecting data that an application executed by a computing device attempts to transmit over a network, even though such outgoing data is encrypted for its transmission over the network. A technique is provided for intercepting a request from the application to encrypt the data, the request comprising an unencrypted data and directed to a component of an operating system of the computing device that provides security for communications over networks and performs data encryption/decryption.

The interception may be performed by an intercepting component implemented using a known programming technique referred to as an application programming interface ("API") hooking. The API hooking allows intercepting calls from the application to the component of the operating system that performs data encryption. The data encryption may be performed in accordance with a Secure Socket Layer (SSL) protocol, a Transport Layer Security (TLS) protocol or any other protocol.

Intercepting the request from the application may provide access to the unencrypted data. The unencrypted data, along with an identifier for an encrypted data, is provided to a data inspection facility of the network security system. The intercepted request proceeds to the encryption component which encrypts the unencrypted data to provide encrypted data. The encrypted data is then provided to the data inspection facility, which may establish a correspondence between the unencrypted data and the encrypted using the identifier for the encrypted data. The correspondence may be established because the data inspection facility receives unencrypted and encrypted data from multiple application processes and may not discern which received unencrypted data is an encrypted form of which received encrypted data.

The data inspection facility may identify a corresponding unencrypted data for received encrypted data and inspects the unencrypted data to determine whether to allow or block transmission, in an encrypted form, of this data over the network. When the transmission is allowed, the received encrypted data may be transmitted over the network.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

A computing device in a networked environment may exchange data over a network such as the Internet with other computing devices in the networked environment. The inventors have appreciated that, to ensure security of the computing device and to protect data that an application executed on the computing device attempts to transmit over the network, it may be desirable to both encrypt the data and to inspect content of the data to determine whether the data is allowed to be transmitted. While encryption permits protecting confidentiality of the data by preventing malicious or any other party different from a party to whom the data is being sent from accessing the data, inspection of the content of the data may allow determining whether the data is malicious or whether any restrictions on distribution of the data outside of the computing device apply.

The determination of whether the data is allowed to be transmitted over the network may be performed by a suitable system implementing network security functionality. Network security systems that control access of data to a network typically require the data to be in a clear text form meaning that the data is unencrypted so that its content may be accessed by a network security system. At the same time, the data may be encrypted prior to being transmitted over a network. As a result, it may not be straightforward for existing network security systems to inspect content of such encrypted data.

Existing approaches to providing data to network security systems in a form that allows the systems to inspect and interpret the data include implementing security systems that act as a proxy between a client executing an application and a server. When such mechanisms are used, the security systems may decrypt encrypted data, inspect it, and encrypt the processed decrypted data. However, such decryption/encryption may modify a certificate used to sign the data. Accordingly, a user may see a certificate provided by the proxy rather than by a party whose certificate the user expects to see. For example, instead of a SSL certificate from a known certificate provider (e.g., the VeriSign®), the user may see a certificate used by the proxy. This may adversely affect user experience. In addition, such proxy systems may be complex to deploy and manage.

The inventors have recognized and appreciated that a method, system and computer-readable storage medium for implementing a technique for both encrypting or decrypting data transmitted over a network and determining whether transmitting the data may provide a potential risk of security vulnerability or violation of information control may be provided. The technique may allow a suitable network security system to inspect the data, which is being encrypted for transmission over a network, in an unencrypted form. As a result, the security of the network communications may be improved without compromising the requirement to encrypt the data to protect it from access by undesirable parties.

The technique may involve intercepting a request from an application that attempts to transmit data over a network to an interface that provides access to a component of the operating system providing security of network communications. In some embodiments, the request may be a request to encrypt the data directed to an encryption component which may be part of the operating system. The interception may involve overriding certain functions of the component providing security of network communications.

The request, comprising unencrypted data that the application attempts to transmit over the network, may be a request to encrypt the unencrypted data. The interception of the request may allow gaining access to the unencrypted data that the application provides, for encryption, to the encryption component and to encrypted data provided by the encryption component as a result of encrypting the unencrypted data. Accordingly, no additional encryption or decryption may be required, and the interception may therefore be performed in a manner transparent to a user. In addition, no additional certificates may be provided for the user to view. These may improve user experience.

Applications may perform theirs tasks by interacting with an operating system by presenting to the operating system requests, or calls, via an application programming interface ("API"), as known in the art. For example, an application may present to the operating system a request for a desired service. In some embodiments of the invention, this may be a request to encrypt data that the application attempts to transmit over a network.

In some embodiments of the invention of the invention, interception of requests, or calls, from the application to the encryption component, in accordance with some embodiments of the invention, may be performed using an application programming interface ("API") hooking API hooking is a programming technique employed when it is desirable to change a manner in which an application interacts with an operating system or any other program. API hooking thus allows interception of calls to the operating system made by an application during its execution.

In the API hooking, the "hooks" may be computer-executable instructions that redirect certain computer-readable instructions from their original path. Thus, API hooking may include the redirection of an API call directed to the operating system to some other component, such as a replacement function. Such function may perform some manipulation or other processing of input parameters of the API call before transferring control back to the called API. The replacement function may also manipulate return results of the API before passing the return results back to the caller of the API.

In some embodiments, intercepting the request from the application may provide access to the unencrypted data. The unencrypted data, along with an identifier for corresponding encrypted data, may be provided to a data inspection facility. The identifier may be, for example, a part of the encrypted data, such as a prefix of the encrypted data. The intercepted request proceeds to the encryption component which encrypts the unencrypted data to provide encrypted data.

The encrypted data may be provided to the data inspection facility, which may establish a correspondence between the unencrypted data and the encrypted data using the identifier for the encrypted data. The correspondence may be established because the data inspection facility receives unencrypted and encrypted data from multiple application processes, which each may establish multiple connections, and may not discern which received unencrypted data is an encrypted form of which received encrypted data. Establishing a correspondence between unencrypted data and corresponding encrypted data allows performing asynchronous inspection of outgoing data.

The data inspection facility may identity a corresponding unencrypted data for received encrypted data and inspect the unencrypted data to determine whether to allow or block transmission, in an encrypted form, of this data over the network. Any suitable policies may be employed while inspecting the unencrypted data.

The policies may be acquired by the computing device in any suitable way. For example, the policies (which may be configurable) may be installed as part of an operating system executed by the computing device, may be provided by a user of the computing device, or received via the Internet. As another example, if the computing device belongs to an enterprise network, the computing device may transmit data in accordance with policies of the enterprise. The enterprise policies may define, for example, what type of information is undesirable to be communicated outside of the enterprise. Such information may comprise personal information (e.g., social security numbers of organization's employees or customers), medical records, financial records, description of confidential technology, and other sensitive information.

When the data inspection facility determines, based on the inspection of the unencrypted data, that transmission of the encrypted data is allowed, the encrypted data may be transmitted over the network. Alternatively, when the data inspection facility determines that the unencrypted data comprises malicious data (e.g., malware, Trojans, or viruses) or may compromise confidentiality of information, the encrypted data may be blocked from being transmitted over the network.

Figure 1:
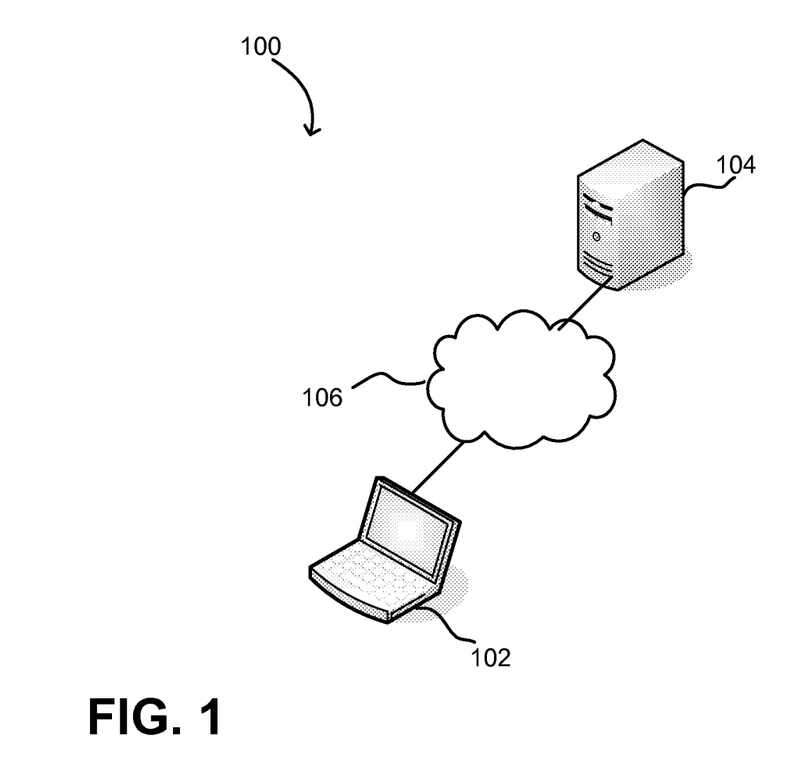
FIG. 1 is a block diagram of an overview of a computer system in which some embodiments of the invention may be implemented.

FIG. 1 illustrates an example of a network computing environment 100 in which aspects of the invention may be implemented. Computing environment 100 may comprise a client 102 and a server 104 which may communicate via a network 106. Network 106 may be any suitable network. For example, network may be a public network, such as the Internet.

Client 102 may be any end station device that receives network services, such as a workstation, personal computer, personal digital assistant or any other suitable computing device. Server 102 may be any suitable computing device that provides network services to one or more clients, such as a workstation, personal computer, mini-computer, mainframe, or any other suitable computing device. Any suitable communication protocol, such as a TCP/IP protocol, may be used for communications between the client 102 and server 104. Though, embodiments of the invention are not limited to a particular way of communication between client 102 and server 104.

In some embodiments, client 102 may be part of a private network, such as an enterprise or an organization's network. In such scenarios, another computer may acts as a gateway to client 102 operating behind the gateway. In an enterprise network, client 102 may operate in accordance with certain privacy, security and other rules imposed by the enterprise network.

In the example illustrated, client 102 may comprise components that provide control over data which client 102 transmits and receives over network 106, in accordance with some embodiments of the invention. Client 102 may execute ( ) an application, such as an Internet Explorer or any other suitable application, which may attempt to transmit or receive data over network 106. The components providing control over the data may provide functionality that allows inspection of data that client 102 attempts to send over network 106, even though the data is being encrypted. This may be performed efficiently and in a manner that is transparent to a user of one or more applications hosted on client 102.

In one embodiment of the invention, server 104 may be a SSL server and client 102 may be a SSL client, meaning that each is capable of communicating data encrypted in accordance with the SSL protocol. The SSL protocol allows for client 102 and server 104 to communicate in a secure manner over a public network. Though, any other suitable protocols may be used for communicating data between client 102 and server 104. It should also be appreciated that client 102 and server 104 may be any suitable computing devices which may comprise any components which are not shown in FIG. 1 for the sake of simplicity.

It should be appreciated that any of the computers described above and any of their components can be implemented in any of numerous ways. For example, the functional components or operations described herein may be implemented using software, hardware or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Figure 2:
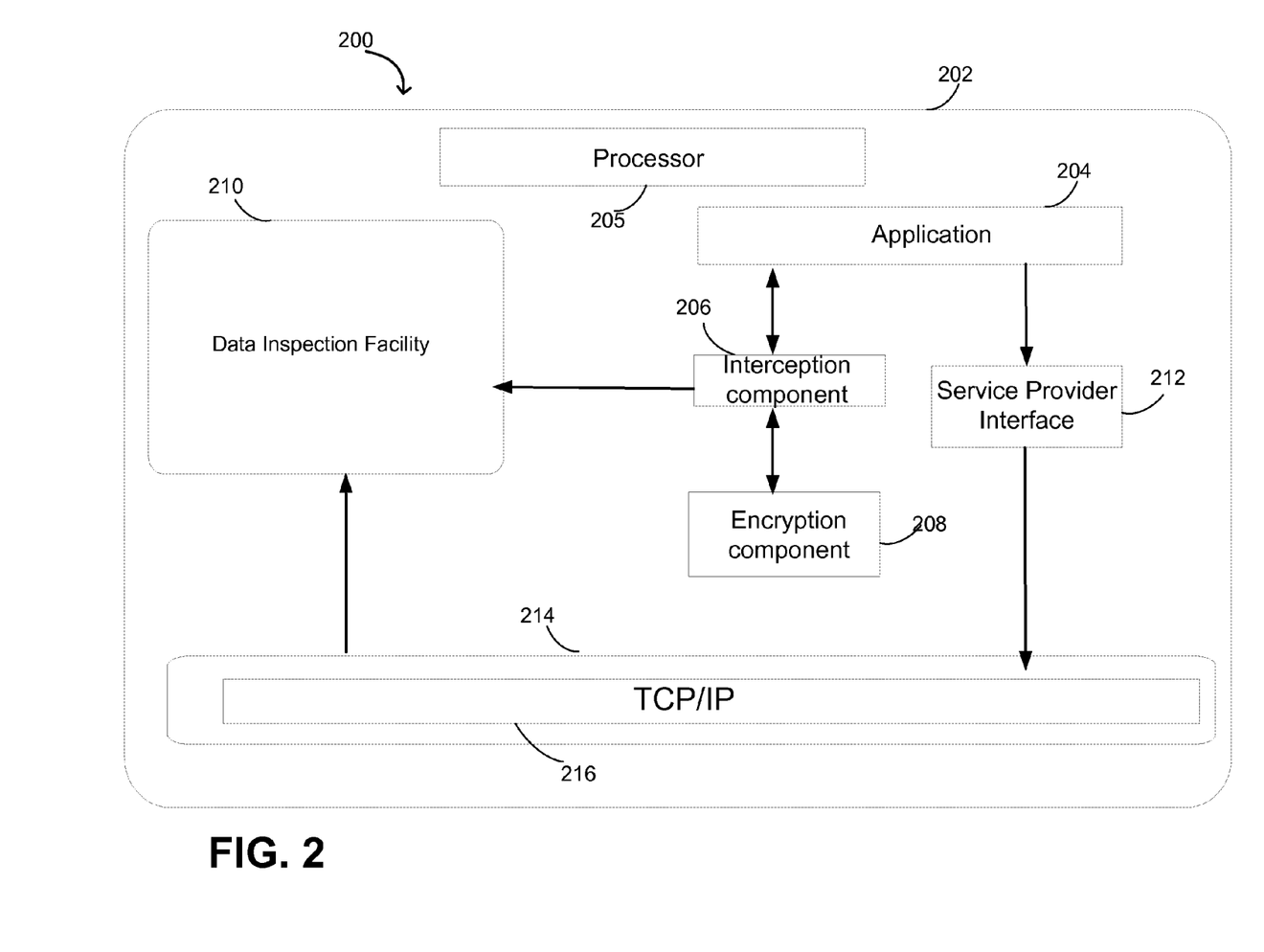
FIG. 2 is a block diagram of an architecture of a computer system in which some embodiments of the invention may be implemented.

FIG. 2 illustrates an exemplary architecture of a computing system 200 in which some embodiments of the invention may be implemented. Computing system 200 may comprise computing device 202 (e.g., client 102 in FIG. 1) comprising an application 204, an encryption component 208 and an interception component 206 that intercepts requests from application 204 to encryption component 208. Computing device 202 may be a workstation, personal computer, personal digital assistant or any other suitable computing device and may comprise any suitable components.

Computing device 202 may support applications such as application 204 which may be an email, web browsing, database access or any other application. For example, in some embodiments, application 204 may be Microsoft® Internet Explorer®, Microsoft® Outlook® or any other suitable application. It should be appreciated that computing device 202 may execute, by a processor 205 which may be one or more of any suitable processors, more than one application.

Application 204 may communicate with other computing devices on a network (e.g., network 106) by establishing a secure connection with each of the devices and attempting to send/receive data over the secure connection. The data may be, for example, an email message comprising (in its body and/or as an attachment) text, images, graphics, a combination thereof or any other information. Also, in scenarios where application 204 comprises a web browser, the data may comprise any data entered via the web browser and thus sent to a remote computer, such as server 104 (FIG. 1). Though, it should be appreciated that embodiments of the invention are not limited to a particular type or format of data that application 204 may transmit or receive over the network. In addition, even though some embodiments of the invention are described in connection with intercepting and inspecting of outgoing data that application 104 attempts to transmit over the network, it should be appreciated that the techniques described herein may apply to incoming data as well.

In some embodiments of the invention, application 204 may attempt to transmit data over the network. To increase security and confidentiality of the outgoing data transmitted by application 204, the outgoing data may be encrypted. Transmitting the data via the network in an encrypted form may deter access and possible alteration of the data by a party other than a party to which the data is destined.

To encrypt the outgoing data, application 204 may present a request to encrypt the data to encryption component 208. In some embodiments, encryption component 208 may be a SSL component. SSL protocol may be defined as an enhancement to the TCP/IP standards of network protocol for secure communication between devices, as known in the art. Application 204 may use SSL protocol to establish a secure connection with a computing device (e.g., server 104) to which application 204 attempts to send data. Though, it should be appreciated that encryption component 208 may utilize any other suitable protocol, such as a Transport Layer Security (TLS) protocol or others. It should also be appreciated that encryption component 208 is referred to herein as "encryption" component for the sake of simplicity only as encryption component 208 may perform decryption of encrypted data and any other suitable functions.

Encryption component 208 may encrypt unencrypted data (e.g., information including unencrypted text, images, graphics and any combination thereof) received, via a call from interception component 206, from application 204. The encryption may be performed in accordance with any suitable encryption algorithm. It should be appreciated that, in some embodiments, encryption component 208 may also decrypt secure (encrypted) data received on computing device 202.

In embodiments of the invention in which Windows operating system available from the Microsoft Corporation of Redmond, Wash. is deployed, encryption component 208 may be a security provider such as secure channel ("schannel") which is implementation of the SSL and its successor, TSL, by the Microsoft Corporation. Schannel may be implemented as part of the operating system. Also, in some embodiments, it may be part of application 204. Though, it should be appreciated that encryption component 208 may be implemented in any other suitable manner as embodiments of the invention are not limited in this respect.

Interception component 206 shown in FIG. 2 may intercept a request from application 204 to encrypt data that application 204 attempts to transmit, via a secure connection, over a network. It should be appreciated that interception component 206 may be implemented in any other suitable manner as embodiments of the invention are not limited in this respect.

In some embodiments, interception component 206 may be implemented using a programming technique referred to as API hooking. API hooking may include intercepting requests from application 204 directed to a component of the operating system that implements encryption and decryption of data. In the example illustrated, such component may be encryption component 208. By employing such API hooking technique, in comparison to existing systems, no additional certificates are required because encryption component 208 perform the encryption and, in some embodiments, decryption of the data, and no additional component is provided to perform encryption/decryption. Accordingly, the interception of outgoing data by interception component 206 and subsequent inspection of outgoing the data for security vulnerabilities may be transparent to the user of computing device 202, which, in addition to providing enhanced security, improves user experience.

In embodiments of the invention in which an operating system developed by the Microsoft Corporation is employed, one or more suitable functions of a library may be used to intercept API requests, or calls, from application 204 to a suitable component of the operating system, such as encryption component 208. For example, the function(s) of the library may be utilized to override a function to initialize schannel.dll of encryption component 208 which performs encryption and decryption of data in accordance with a SSL or other suitable protocol. The library may be, for example, Detours library, or any other suitable set of software components.

In some embodiments, interception component 206 may be implemented to provide functionality of an interface to encryption component 208. For example, interception component 206 may be implemented to provide a set of functions of an application programming interface referred to as Security Support Provider Interface ("SSPI") which supports implementation of SSL, TLS and other suitable protocols, developed by the Microsoft Corporation. These functions may be used to access the schannel.dll. Accordingly, in embodiments of the invention in which computing device 202 executes Windows operating system, interception component 206 may be implemented to execute functions of SSPI that allow interception component 206 to be loaded into a process space of application 204 when the application executes.

In some embodiments, API hooking utilized by interception component 206 may be implemented by injecting a dynamic link library ("DLL") into a process space of the application. In some scenarios, a DLL may be a file containing executable instructions such as functions of SSPI which may be loaded and executed by application 204 while it is running. The DLL may be a library registered in operating system configuration (e.g., registry in a Windows operating system). Though, it should be appreciated that API hooking may be implemented in any other suitable way as embodiments of the invention are not limited in this respect.

Regardless of a particular way in which encryption component 208 and interception component 206 are implemented, as a result of interception of the request to encryption component 208 to encrypt the unencrypted data, interception component 206 may gain access to both unencrypted data and its encrypted counterpart. Interception component 206 may provide the unencrypted data and an identifier of the encrypted data to data inspection facility 210.

Application 204 may provide encrypted data to service provider interface 212 which operates as an interface between application 204 and networking manager component 214. It should be appreciated that service provider interface 212 is shown as a separate component by way of example only as it may be part of networking manager 214 or any other suitable component. Service provider interface 212 may translate encrypted data acquired from application 104 into data of a format required by TCP/IP component 216. In embodiments of the invention in which Windows operating system is implemented, service provider interface 212 may comprise WinSock. Winsock is a DLL that serves as an interface to a transport service provider which is, in this example, TCP/IP component 216 of networking manager 214. Winsock may be implemented in accordance with any techniques, such as those as known in the art or others.

Service provider interface 212 may communicate with networking manager 214 and may provide encrypted data received from application 204 to networking manager 214. Networking manager 214 may be a facility that allows communication of computing device 202 via a network. TCP/IP component 216 of networking manager 214 may be a protocol stack component which is a part of a core of operating system of computing device 202. Networking manager 214 may comprise any other suitable components and communicate with a network interface hardware which provides physical interface to the network.

As shown in FIG. 2, networking manager 214 may communicate with data inspection facility 210 which may detect malware, viruses and other malicious data in inspected data. Also, data inspection facility 210 may inspect data to determine whether transmitting the data over a network may result in loss of confidentially of certain sensitive information. This may be performed using policies.

Data inspection facility 210 may receive the encrypted data via a path from application 204, via networking manager 214. Data inspection facility 210 may not be able to discern which connection established by application 204 provided the received encrypted data. Accordingly, the unencrypted data may be provided to data inspection facility 210 by interception component 206 along with an identifier of corresponding encrypted data. Data inspection facility 210 may establish a correspondence between the unencrypted data and its encrypted counterpart, the encrypted data, using the identifier of the encrypted data. The identifier may comprise any suitable subset(s) of the encrypted data.

After the correspondence between the unencrypted data and the encrypted data is established, data inspection facility 210 may inspect the unencrypted data for content that may trigger security vulnerabilities or violate any suitable confidentiality and security policies. Data inspection facility 210 may thus determine whether to allow transmission of the encrypted counterpart of the corresponding encrypted data.

It should be noted that techniques implemented in accordance some embodiments of the invention are described herein in connection with interception and inspection of outgoing data that application 104 attempts to transmit over the network in an encrypted form. Though, it should be appreciated that embodiments of the invention may apply to decrypting and inspecting inbound data sent to application 204 over the network as well.

Figure 3:
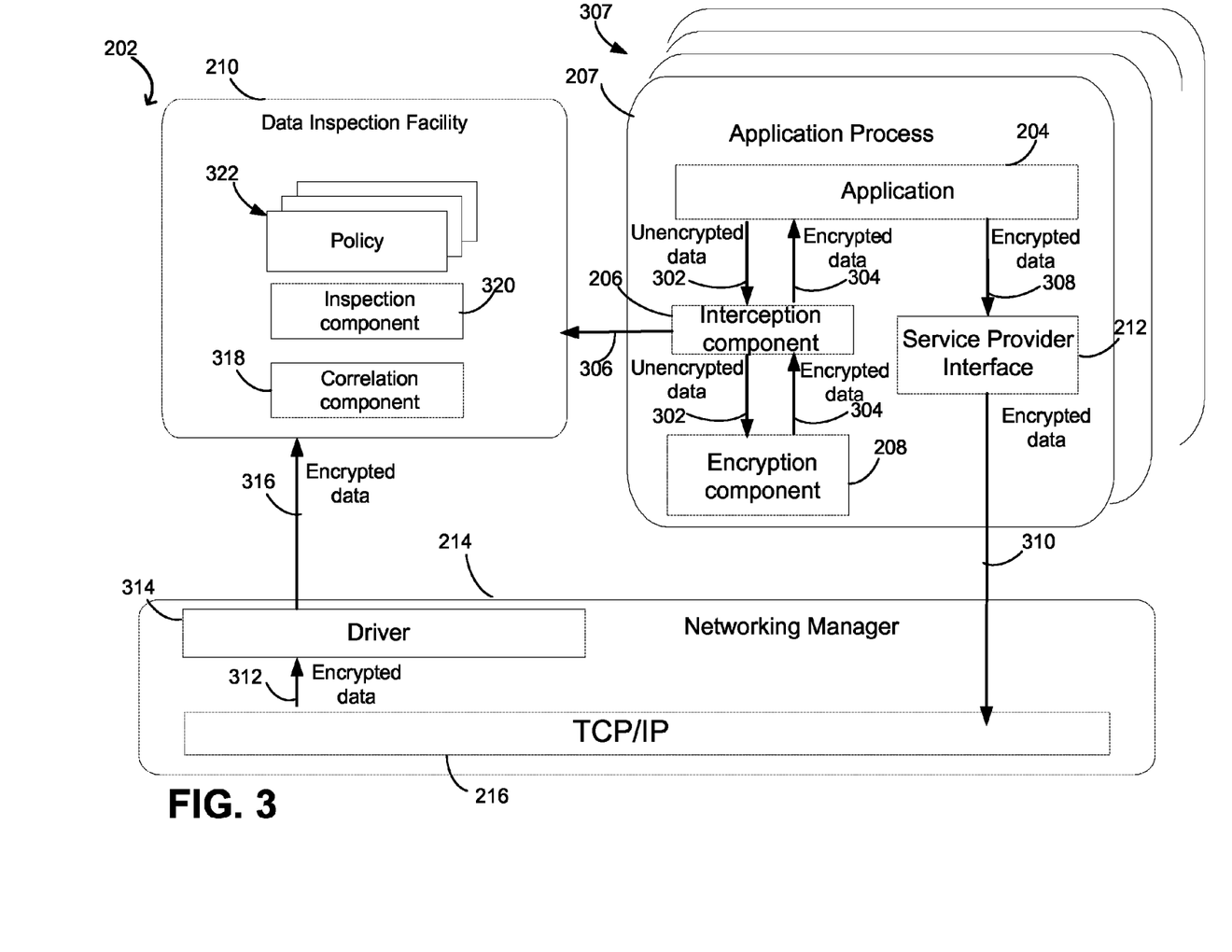
FIG. 3 is a block diagram of a more detailed architecture of the computer system in which some embodiments of the invention may be implemented.

FIG. 3 illustrates in more detail components of computing device 202 in which some embodiments of the invention may be implemented and interaction between the components. Components shown in FIG. 2 are illustrated in FIG. 3 as well. It should be appreciated that computing device 202 may comprise any other suitable components that are not shown in FIG. 3 for simplicity of the representation.

FIG. 3 illustrates schematically that application 204 may be executed in a process space 207 of application 204. Process space 207 may be defined as a separate space in memory of computing device 202 allocated to application 204 when it executes. FIG. 3 illustrates by way of example only that process space 207 may comprise application 204, which may be a business logic of the application defining the application's functionality, interception component 206, encryption component 208 and service provider interface 212. In the example illustrated, computing device 202 may comprise multiple process spaces 307.

Application 204 may provide a request 302 to encryption component 208 to encrypt an unencrypted data that application 204 attempts to transmit over the network. As shown in FIG. 3, request 302 may be intercepted by interception component 206. The interception may be performed via an API hooking technique or in any other suitable manner.

After request 302 is intercepted by interception component 206, request 302 may proceed to its original destination, encryption component 208. Encryption component 208 may encrypt the unencrypted data to provide corresponding encrypted data, as shown (304) in FIG. 3. The encryption may be performed in accordance with any suitable cryptographic or encryption algorithm(s). The encrypted data may also be intercepted by interception component 206. Hence, interception component 206 acquires both the unencrypted data and corresponding encrypted data. It should be appreciated that while request 302 is intercepted by interception component 206, the interception does not interfere with request 302 meaning that request 302 reaches encryption component 208 which then provides, in response to the request, the encrypted data to application 304.

Computing device 202 may execute more then one application at a time, which is shown schematically in FIG. 3 as multiple process spaces 307, where each process spaces may correspond to a different application. Moreover, an application such as application 204 may establish more than one TCP connection to a computing device (e.g., server 104) with which the application may exchange data over the TCP connection. Thus, process spaces 307 may comprise more than one process space for more than one respective TCP connection established by the same application.

Each of process spaces 307 may comprise a separate instance of interception component 206. Accordingly, multiple unencrypted and corresponding encrypted data may be intercepted by interception component 206. These unencrypted and corresponding encrypted data may be forwarded, via respective different paths, to data inspection facility 210. When data inspection facility 210 receives the unencrypted data and corresponding encrypted data, data inspection facility 210 may not be able to determine which unencrypted and encrypted data are forwarded by the same application process or for the same connection of multiple connections established by an application. Hence, for the purpose of establishing a correspondence between unencrypted data and its encrypted counterpart, the encrypted data, an identifier of the encrypted data may be employed.

Interception component 206 may generate the identifier for the encrypted data which comprises identification information on the encrypted data. The identification information may be any suitable subset(s) of the encrypted data. The identification information may comprise information identifying a connection over which application 204 attempts to send data and an instance of interception component 206 executed within process space 207, and/or any other suitable information used to identify the encrypted data so that to establish, in data inspection facility 210, a correspondence between the encrypted data and its unencrypted counterpart.

The unencrypted data and the identifier for the corresponding encrypted data acquired by interception component 206 may be forwarded to data inspection facility 210, as shown by an arrow 306 in FIG. 3. Interception component 206 may be loaded into a process space of every application that transmits data over a secure connection. Thus, multiple instances of interception component 206 may be executed. Separation of the interception and inspection functionality into separate processes may improve efficiency in terms of memory consumption.

Accordingly, in some embodiments, while interception component 206 is executed, by one or more processors of computing deice 202 (e.g., processor 205 in FIG. 2), in process space 207, data inspection facility 210 may be executed, by the one or more processors, in a separate process space. These separate processes may communicate via an interprocess communication mechanism, referred to as a remote procedure call (RPC), that enables data exchange and invocation of functionality residing in a different process. In some embodiments, the unencrypted data and the identifier may be forwarded to data inspection facility 210 via such RPC. Though, it should be appreciated the unencrypted data and the identifier may be forwarded to data inspection facility 210 in any suitable way as embodiments of the invention are not limited in this respect.

The encrypted data provided by encryption component 208 to application 204 may be sent to service provider interface 212, as shown by an arrow 308. Service provider interface 212 may be WinSock or any other suitable component which may forward the encrypted data to TCP/IP component 216 of networking manager 214. Service provider interface 212 may thus forward the encrypted data to TCP/IP component 216 of networking manager 214, as shown by an arrow 310 in FIG. 3.

TCP/IP component 216 of networking manager 214 may forward the encrypted data, via driver 314, to data inspection facility 210, as shown by respective arrows 312 and 316. Driver 314 may be any suitable component that may provide encrypted data from TCP/IP component 216 to data inspection facility 210. For example, driver 314 may be Transport Driver Interface ("TDI") driver, Windows Filtering Platform ("WFP") driver, and any other suitable component.

FIG. 3 illustrates that data inspection facility 210 may receive (306), from interception component 206, the unencrypted data and the identifier of the encrypted data corresponding to the unencrypted data. Also, data inspection facility 210 may receive (316) the encrypted data from driver 314 of networking manager 214. Data inspection facility 210 may comprise a component, such as a correlation component 318 shown in FIG. 3, that may correlate the unencrypted data and encrypted data by establishing a correspondence between the unencrypted and encrypted data using the identifier of the encrypted data. As a result of the correlation, data inspection facility 210 may determine that the encrypted data and unencrypted data represent the same data in an encrypted and unencrypted form, respectively. The correlation may allow asynchronous inspection of the encrypted data meaning that more than one process may execute an instance of encryption component 206, with each of the instances intercepting requests from application 204 and providing intercepted unencrypted data to data inspection facility 210.

Data inspection facility 210 may also comprise inspection component 320 which may inspect the encrypted data to determine whether to allow transmission of the encrypted data over the network or block the encrypted data from being transmitted. In some embodiments, inspection component 320 may utilize one or more policies in inspecting the encrypted data. FIG. 3 illustrates that data inspection facility 210 may comprise policies 322 which may be utilized by inspection component 320 in inspecting the encrypted data. Though, it should be appreciated that policies 322 are shown to be part of data inspection facility 210 by way of example only as the policies may be located on one or more of any suitable components in computing device 202.

Policies 322 may be acquired by the computing device 202 in any suitable way and from any suitable source. For example, policies 322 may be default policies provided to computing device 202 as part of an operating system (e.g., Windows operating system) installed on computing device 202. A user of computer may be enabled to configure policies 322.

In embodiments of the invention where computing device 202 is part of an enterprise network, policies 322 may be obtained by computing device 202 from a facility that manages policies within the enterprise network. As an example, an enterprise may define which information may not be allowed to be transmitted outside of computers forming the enterprise network. Policies 322 may also comprise information related to, for example, a user, application, services and any other suitable information used in inspection of outgoing (and, in some embodiments, incoming) network traffic. In some embodiments, policies 322 may be obtained via the Internet. Though, it should be appreciated that embodiments of the invention are not limited to any particular way in which policies 322 for data inspection facility 210 may be acquired.

Inspection component 320 or other suitable component(s) of data inspection facility 210 performing inspection of encrypted data for presence of malicious data may have pattern matching capabilities that allow it to indentify patterns in inspected data that may be indicative of malware. Though, it should be appreciated that the inspection of encrypted data may be performed in any suitable manner as embodiments of the invention are not limited in this respect.

Data inspection facility 210 may be implemented in any suitable manner. In some embodiments, data inspection facility 210 may be an implementation of the Microsoft Corporation referred to as Network Inspection Service which provides security for network communications.

In some embodiments of the invention, data inspection facility 210 may execute in a user mode. To receive data that may be provided from a kernel mode, data inspection facility 210 may include what may be referred to as interception points (not shown) which may be defined as components used to receive data from the kernel mode and provide the data to a core of data inspection facility 210.

It should be appreciated that components shown in connection with FIG. 3 may be stored in a suitable computer readable storage medium which may be any suitable non-transitory, tangible computer storage medium. The components may be executed by one or more processors. In the example illustrated, components shown in FIG. 3 may be located on the same computing device 202. Though, it should be appreciated that the components may be located on different computing devices or may be apportioned in a suitable way between more than one computing device.

Figure 4:
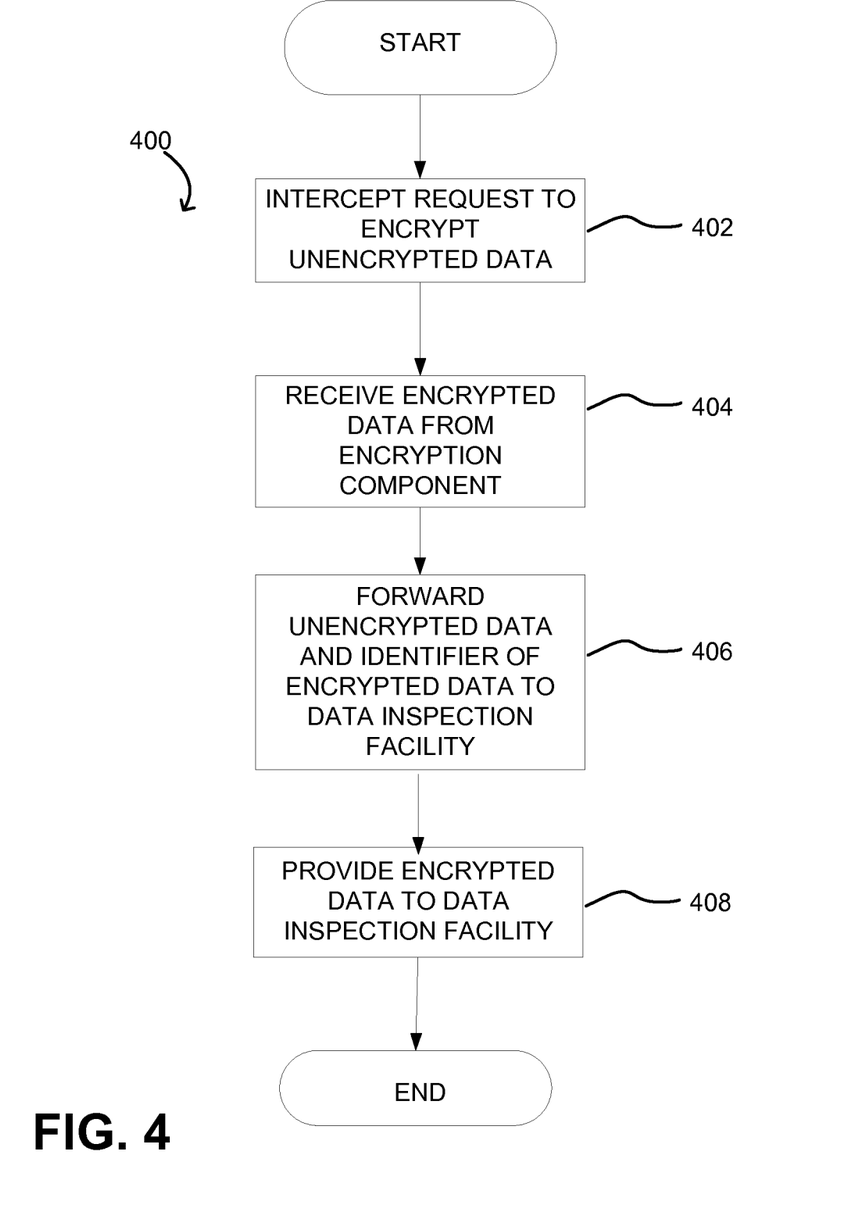
FIG. 4 is a flowchart illustrating a process of intercepting and inspecting outgoing data, in accordance with some embodiments of the invention.

FIG. 4 illustrates a process 400 of intercepting a request from an application to encrypt an unencrypted data. The unencrypted data may comprise any suitable text, image, graphics information, any combination thereof or any other suitable data.

Process 400 may start at any suitable time. For example, process 400 may start when an application (e.g., application 204) is running on a computing device (e.g., a user is using application 204) and attempts to transmit the data over the network. For example, the application may be attempting to send an email message or to provide data over the network in any other suitable way.

At block 402, process 400 may intercept a request from the application to encrypt the unencrypted data. The request may be an API call and may be directed to a component of an operating system of the computing device that performs data encryption (e.g., encryption component 208 in FIGS. 2 and 3).

The interception of the request may be performed, for example, by interception component 206 (FIGS. 2 and 3). In some embodiments, it may be performed in accordance with an API hooking technique. The API hooking allows intercepting a request from the application to the encryption component, the request including outgoing unencrypted data to be encrypted by the encryption component. The interception also involves interception of a return result of the request, which is, in the example illustrated, encrypted data provided by the encryption component as a result of encryption of the unencrypted data. The encryption may be performed using SSL protocol. Though, embodiments of the invention are not limited in this respect and any other suitable protocol (e.g., TLS) or data encryption technique may be used to encrypt the data.

Intercepting the request may thus allow gaining access to the unencrypted data and to the encrypted data after the unencrypted data has been encrypted by the encryption component. Thus, at block 404 of process 400, the encrypted data may be received from the encryption component.

Next, process 400 may continue to block 406 where the interception component may forward the unencrypted data acquired as a result of interception of the request from the application to a component that performs inspection of the unencrypted data for presence of any indication that the unencrypted data may trigger security vulnerabilities. In some embodiments, such component may be data inspection facility 210 (FIGS. 2 and 3).

In addition to forwarding the unencrypted data to data inspection facility 210, the interception component may forward to data inspection facility 210 an identifier of the encrypted data that is an encrypted form of the unencrypted data. The identifier may comprise any suitable information that allows determination of a correspondence between the unencrypted data and its encrypted form, the encrypted data. In some embodiments, the identifier may be, for example, a part of the encrypted data, such as a prefix of the encrypted data. The prefix may be, for example, first 32 or other number of bytes of the encrypted data. The prefix may be selected so that no actual content of the encrypted data it used in the prefix. When the encryption component utilizes cryptographic algorithms in accordance with the SSL protocol, the prefix of the encrypted data may be assumed to be random enough to associate the unencrypted data and corresponding encrypted data. Though, it should be appreciated that the identifier of the encrypted data may be implemented in any suitable manner as embodiments of the invention are not limited in this respect.

As discussed above, multiple application processes may be executed, each comprising an instance of the interception component. Accordingly, data inspection facility 210 may receive multiple encrypted data as well multiple unencrypted data, which may be related to different application processes. To determine which encrypted data corresponds to which unencrypted data, data inspection facility 210 may employ the identifier.

At block 408, the interception component may forward the encrypted data to data inspection facility 210. This process may involve traversing a number of components by the encrypted data, as shown in connection with FIG. 5.

Figure 5:
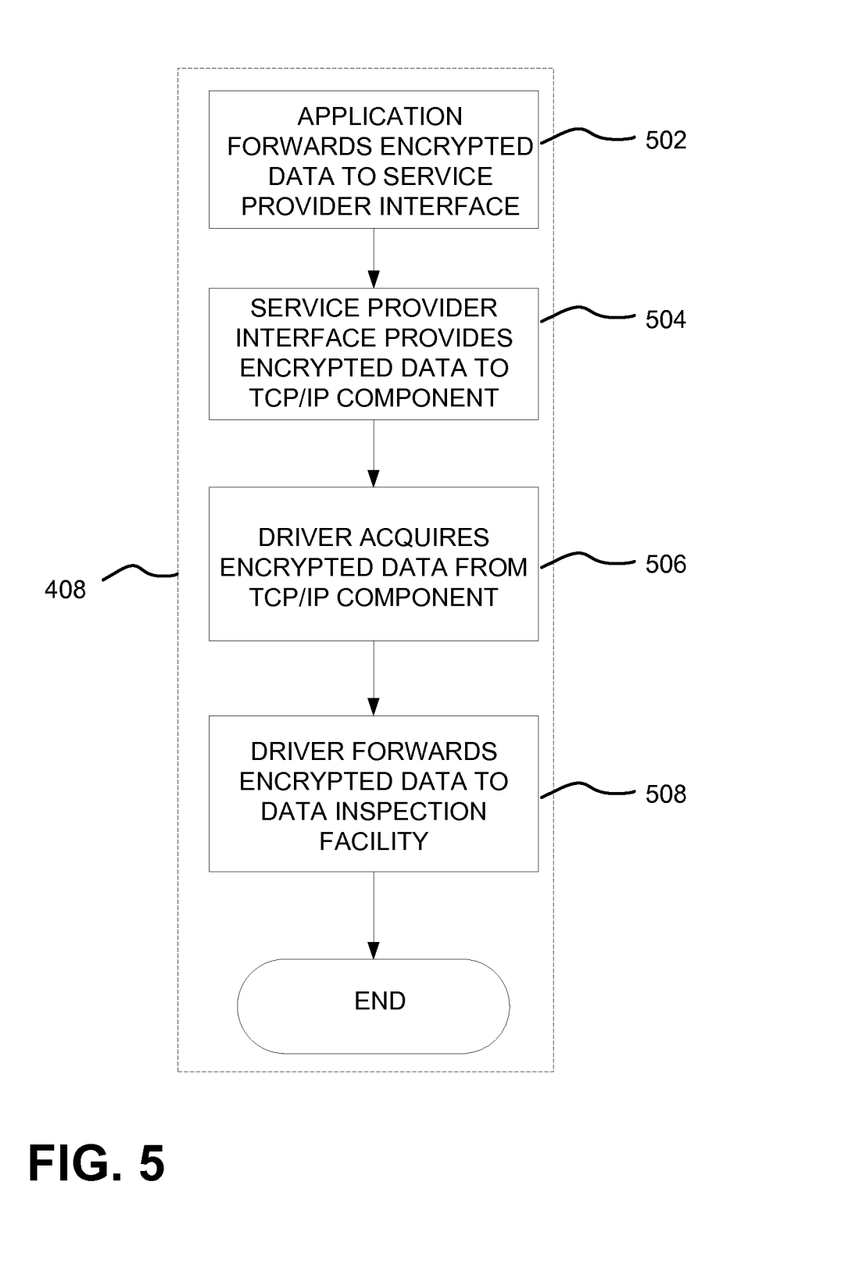
FIG. 5 is a flowchart illustrating a process of forwarding data to a data inspection facility, as part of processing shown in connection with FIG. 4, in accordance with some embodiments of the invention.

FIG. 5 illustrates that, at block 502, the application may forward the encrypted data to the service provider interface (e.g., service provider interface 212), which may then forward, at block 504, the encrypted data to a TCP/IP component of a networking manager, such as TCP/IP component 216 of networking manager 214 shown in FIGS. 2 and 3. In some embodiments, the service provider interface may be Winsock.

Next, a driver (e.g., driver 314 in FIG. 3) from the networking manager may acquire the encrypted data from the TCP/IP component, at block 506, and to forward the encrypted data to a data inspection facility (e.g., data inspection facility 210), at block 508. Driver 214 may be, for example, Transport Driver Interface ("TDI") driver, Windows Filtering Platform ("WFP") driver, or any other suitable component that may provide encrypted data from the networking manager to the data inspection facility. It should be noted that processing shown in connection with blocks 502-508 in FIG. 4 illustrates an exemplary path for the encrypted data. Any suitable path may be utilized to provide the encrypted data to the data inspection facility, depending on a deployed operating system.

Figure 6:
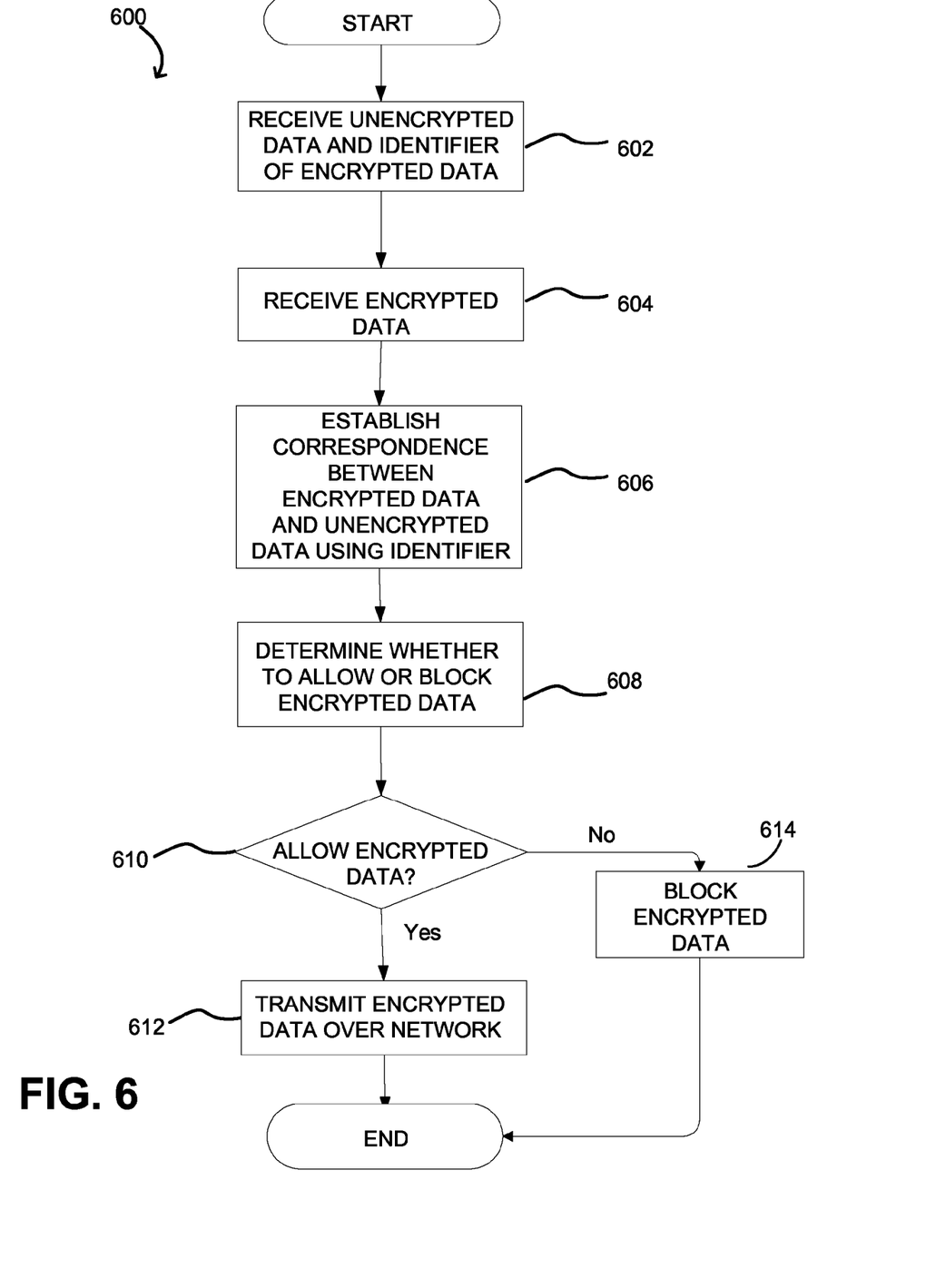
FIG. 6 is a flowchart illustrating processing of unencrypted and encrypted data by the data inspection facility, in accordance with some embodiments of the invention.

FIG. 6 shows a process 600 illustrating processing performed by a network data inspection component such as data inspection facility 210. Process 600 may start at any suitable time. For example, process 600 may start when an application executes on a computing device (e.g., computing device 202) and attempts to transmit outgoing data over the network. Such network traffic may be inspected by data inspection facility 210.

At block 602, data inspection facility 210 may receive the unencrypted data and an identifier of the encrypted data from the interception component which may obtain these data as described above. The identifier of the encrypted data and the unencrypted data may be provided to data inspection facility 210 in any suitable manner which allows associating the identifier and the unencrypted data. In some embodiments, the interception component may utilize a remote procedure call to forward the identifier of the encrypted data and the unencrypted data to data inspection facility 210. Data inspection facility 210 may thus perform inspection of data in a process separate from the application process, which may be an improvement in terms of efficiency of inspecting outgoing network traffic and overall memory consumption by the system.

At block 604, data inspection facility 210 may receive encrypted data. It should be appreciated that embodiments of the invention are not limited to a particular order in which processing at blocks 602 and 604 is performed and processing at block 604 may be performed prior to processing at block 602.

Next, at block 606, data inspection facility 210 may correlate the unencrypted data and encrypted data, using the identifier. The correlation may involve determining that the encrypted data is an encrypted form of this particular unencrypted data. The correlation may be performed in any suitable manner. In some embodiments, the correlation may involve scanning the encrypted data (e.g., using a pattern matching technique) to determine whether the encrypted data comprises information included in the identifier. If the match is successful, it may be determined that the encrypted data is an encrypted form of the unencrypted data associated with the identifier.

Accordingly, at block 608, data inspection facility 210 may inspect the unencrypted data to determine whether this data, in an encrypted form comprising the encrypted data, may be allowed to be transmitted over the network. The determination may be performed in any suitable manner as embodiments of the invention are not limited in this respect. For example, suitable policies (e.g., policies 322 in FIG. 3) may be applied to determine whether to prevent content of the unencrypted data from being accessed outside the computer or a private network to which the computer may belong. Any other suitable techniques may be used to determine whether the unencrypted data comprises malicious data which may compromise security.

At block 610, it may be determined, based on the inspection of the unencrypted data, whether to allow network transmission of the encrypted data or block the encrypted data from being transmitted over the network. If it is determined, at block 610, that the encrypted data is allowed to be transmitted over the network, process 600 may continue to block 612 where the encrypted data may be transmitted over the network. Otherwise, if it is determined, at block 610, that the encrypted data is not allowed to be transmitted over the network, process 600 may branch to block 614 where the encrypted data may be blocked from being transmitted over the network.

Regardless of whether the encrypted data is allowed to be transmitted over the network or is blocked from being transmitted over the network, process 600 may then end. Though, it should be appreciated that data inspection facility 210 may continue operating as more than one application processes may be running when the application executes. Also, multiple applications may be executed on the computer.

It should be appreciated that even though embodiments of the invention are described in connection with intercepting and inspecting outgoing data that an application attempts to transmit over a network, techniques and component described herein may be used to decrypt and inspect incoming data as well. An application executed by a computing device may request over the network any suitable data, in any suitable manner. For example, the data may be downloaded via a web browser, received in a email message or provided to the application in any other suitable manner.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations needed to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package, for example as a web-based social networking service. These functional facilities may, in alternative embodiments, be adapted to interact with other, unrelated functional facilities and/or processes, to implement a software program application. In other implementations, at least some of the functional facilities may be adapted to interact with other functional facilities in such a way as form an operating system, including the Windows operating system, available from the Microsoft Corporation of Redmond, Wash. In other words, in some implementations, the functional facilities may be implemented alternatively as a portion of or outside of an operating system.

The invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computer comprising at least one processor, the method comprising:
   with the at least one processor:
   receiving at least one request from an application at a first component, wherein the application directed the request to a second component configured to encrypt unencrypted data, and wherein the application is unaware of the receipt by the first component;
   receiving encrypted data generated by the second component upon the second component encrypting the unencrypted data in response to the request of the application;
   sending the encrypted data to a data inspection facility; and
   sending the unencrypted data to the data inspection facility, wherein the data inspection facility determines whether portions of the encrypted data correspond with portions of the unencrypted data, and wherein the data inspection facility determines whether to allow through-pass of the received encrypted data over a network based on, at least in part, a result of the determination of correspondence.

2. The method of claim 1, wherein the data inspection facility determines whether to allow through-pass of the received encrypted data over the network based, at least in part, upon an inspection of the unencrypted data.

3. The method of claim 2, wherein inspection of the unencrypted data is based on a policy.

4. The method of claim 1, wherein the data inspection facility determines whether portions of the encrypted data correspond with portions of the unencrypted data based upon an identifier of the encrypted data received from the first component.

5. The method of claim 1 further comprising sending an identifier of the encrypted data with the unencrypted data to the data inspection facility, wherein the identifier is used by the data inspection facility to determine whether portions of the encrypted data correspond with portions of the unencrypted data.

6. The method of claim 5, wherein the identifier is a subset of the encrypted data.

7. The method of claim 1, wherein the second component is configured to encrypt unencrypted data in accordance with a Secure Socket Layer (SSL) protocol.

8. A computer readable storage memory comprising computer-executable instructions, that when executed by a processor, perform a method comprising:
   receiving at least one request from an application at a first component, wherein the application directed the request to a second component configured to encrypt unencrypted data, and wherein the application is unaware of the receipt by the first component;
   receiving encrypted data generated by the second component upon the second component encrypting the unencrypted data in response to the request of the application;
   sending the encrypted data to a third component; and
   sending the unencrypted data to the third component,
   wherein the third component determines whether portions of the encrypted data correspond with portions of the unencrypted data, and wherein the third component determines whether to allow through-pass of the received encrypted data over a network based on, at least in part, a result of the determination of correspondence.

9. The computer readable storage memory of claim 8, wherein the third component determines whether to allow through-pass of the received encrypted data over the network based, at least in part, upon an inspection of the unencrypted data.

10. The computer readable storage memory of claim 9, wherein inspection of the unencrypted data is based on a policy that defines a type of information that is not permitted to be transmitted.

11. The computer readable storage memory of claim 8, wherein the third component determines whether portions of the encrypted data correspond with portions of the unencrypted data based upon an identifier of the encrypted data received from the first component.

12. The computer readable storage memory of claim 8 further comprising sending an identifier of the encrypted data with the unencrypted data to the third component, wherein the identifier is used by the third component to determine whether portions of the encrypted data correspond with portions of the unencrypted data.

13. The computer readable storage memory of claim 12, wherein the identifier is a subset of the encrypted data.

14. The computer readable storage memory of claim 8, wherein the second component is configured to encrypt unencrypted data in accordance with a Secure Socket Layer (SSL) protocol.

15. A computer system for controlling transmission of data over a network, comprising:
a processor coupled to a memory, the memory comprising:
a first component that:
receives at least one request from an application, wherein the application directed the request to a second component configured to encrypt unencrypted data, and wherein the application is unaware of the receipt by the first component;
receives encrypted data generated by the second component upon the second component encrypting the unencrypted data in response to the request of the application;
sending the encrypted data to a data inspection facility; and
sending the unencrypted data to the data inspection facility,
wherein the data inspection facility determines whether portions of the encrypted data correspond with portions of the unencrypted data, and wherein the data inspection facility determines whether to allow through-pass of the received encrypted data over a network based on, at least in part, a result of the determination of correspondence.

16. The system of claim 15, wherein the data inspection facility determines whether to allow through-pass of the received encrypted data over the network based, at least in part, upon an inspection of the unencrypted data.

17. The system of claim 16, wherein inspection of the unencrypted data is based on a policy.

18. The system of claim 17, wherein based the policy defines a type of information that is not permitted to be transmitted.

19. The system of claim 15, wherein the data inspection facility determines whether portions of the encrypted data correspond with portions of the unencrypted data based upon an identifier of the encrypted data received from the first component.

20. The system of claim 15, wherein the first component further sends an identifier of the encrypted data with the unencrypted data to the data inspection facility, wherein the identifier is used by the data inspection facility to determine whether portions of the encrypted data correspond with portions of the unencrypted data.

* * * * *